United States Patent [19]

Ichikawa et al.

[11] Patent Number: 4,906,498
[45] Date of Patent: Mar. 6, 1990

[54] FLEXIBLE OPTICAL RECORDING MATERIAL IN THE SHAPE OF TAPE OR FLOPPY DISK

[75] Inventors: Rinjiro Ichikawa; Toshio Ishida, both of Tokyo, Japan

[73] Assignee: Fujimori Kogyo Co., Ltd., Tokyo, Japan

[21] Appl. No.: 236,971

[22] Filed: Aug. 26, 1988

[30] Foreign Application Priority Data

Aug. 27, 1987 [JP] Japan ................... 62-213701

[51] Int. Cl.$^4$ ............................................. B32B 3/02
[52] U.S. Cl. ....................................... 428/64; 428/65;
428/913; 428/420; 428/522; 346/761;
346/135.1; 430/945; 369/288
[58] Field of Search ................... 428/64, 65, 913, 420,
428/522; 346/76 L, 135.1; 430/945; 369/288

[56] References Cited

U.S. PATENT DOCUMENTS

| | | | |
|---|---|---|---|
| 4,291,100 | 9/1981 | Horijome et al. | 428/522 |
| 4,623,570 | 11/1986 | Alexander et al. | 428/65 |
| 4,636,458 | 1/1987 | Wenzel et al. | 430/296 |
| 4,637,945 | 1/1987 | Masui et al. | 428/35.2 |
| 4,717,624 | 1/1988 | Ikenage et al. | 428/423.1 |
| 4,729,805 | 3/1988 | Alexander et al. | 428/65 |
| 4,801,670 | 1/1989 | DeMartino et al. | 526/258 |
| 4,808,332 | 2/1989 | DeMartino et al. | 526/312 |

FOREIGN PATENT DOCUMENTS

| | | |
|---|---|---|
| 0242158 | 10/1987 | European Pat. Off. . |
| 235741 | 3/1983 | Japan . |
| 62-78746 | 4/1987 | Japan . |
| 78746 | 4/1987 | Japan . |
| 275755 | 11/1987 | Japan . |
| 95251 | 4/1988 | Japan . |

Primary Examiner—Ellis P. Robinson
Assistant Examiner—P. J. Ryan
Attorney, Agent, or Firm—Armstrong, Nikaido, Marmelstein, Kubovcik & Murray

[57] ABSTRACT

A flexible optical recording material in the shape of tape or floppy disk comprising an optically isotropic laminate (A) comprising at least one thermoplastic gas-impermeable synthetic resin film layer (1) and at least one cured crosslinking resin layer (2), said layers having been formed by casting and having a retardation value of not less than 80 nm as a whole, and a recording layer (B) disposed on at least one side of said optically isotropic laminate.

2 Claims, 1 Drawing Sheet

FLEXIBLE OPTICAL RECORDING MATERIAL IN THE SHAPE OF TAPE OR FLOPPY DISK

BACKGROUND OF THE INVENTION

The present invention relates to a flexible optical material in the shape of tape or floppy disk as an information recording medium and more particularly to a flexible optical material comprising an optically isotropic laminate and a recording layer disposed on at least one side of said laminate.

The optical tape or floppy disk for recording information as a function of light energy input is in the development stage today and has been considered to be a useful means of information recording in view of the remarkably high recording density it provides as compared with the magnetic tape.

Several patent applications are already pending in the field of the optical tape. For example, Japanese Unexamined Patent Application No. KOKAI 62-78746 (1987) discloses an optical tape comprising a flexible tape support and an optical recording medium composed of a metal or alloy of variable spectral reflectance. The flexible tape support is described to include plastic bases such as those of polyethylene terephthalate, polyimide, polyvinyl chloride, polycarbonate, etc. and, in the examples shown, a polyimide tape is employed.

Such flexible bases for the optical tape are required to satisfy the following requirements: transparency, a minimum of birefringence (optical isotropy), a sufficient degree of heat resistance to withstand dimensional change or curling under the temperature conditions prevailing during production or use, resistance to the solvent used for coating with the recording medium, resistance to moisture penetration (water vapor impermeability), satisfactory mechanical strength and hardness to withstand deformation, low thermal conductivity, flexibility, and gas impermeability (gas barrier property).

However, the flexible tape bases described in Japanese Unexamined Patent Application No. KOKAI 62-78746 (1987) are only able to meet some of the above requirements and need improvement for practical usefulness.

It is an object of the invention to provide a flexible optical material in the shape of tape or floppy disk including a specified optically isotropic laminate.

Other objects and advantages of the invention will become apparent from the detailed description given hereunder.

SUMMARY OF THE INVENTION

The flexible optical material in the shape of tape or floppy disk according to the present invention comprises an optically isotropic laminate (A) comprising at least one thermoplastic gas-impermeable synthetic resin film layer (1), which is intended to prevent oxidative degradation of a recording layer(s) to be described hereinafter, and at least one cured cross-linking resin layer (2), said layers having been formed by casting and having a retardation value of not less than 80 nm as a whole, and a recording layer (B) disposed on at least one side of said optically isotropic laminate.

DETAILED DESCRIPTION OF THE INVENTION

Optically isotropic laminate (A)

Figure 1:
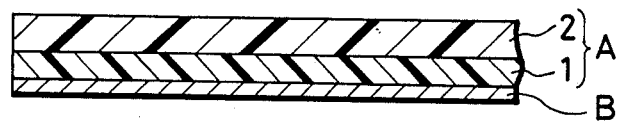
FIGS. 1 to 3 respectively are sectional views showing the flexible optical material of the invention.

The gas-impermeable synthetic film layer (1) as a component member of the optically isotropic laminate (A) may for example be a layer formed from a polymer containing at least 50 mole percent of acrylonitrile, vinyl alcohol or halogenated vinylidene. Particularly useful are polymers having active hydrogen atoms such as polyvinyl alcohol, modified or graft copolymers thereof, ethylene-vinyl alcohol copolymers whose ethylene contents range from 15 to 50 mole percent, and so on. The oxygen permeability (as determined in accordance with ASTM D-1434-75) of this layer is preferably not more than 30 cc/25 hr.m$^2$.atm. and, for still better results, not more than 20 cc/24 hr.m$^2$.atm.

The crosslinking resin used to form said cured crosslinking resin layer (2) includes crosslinkable phenoxy ether resin, epoxy resin, acrylic resin, acryl-epoxy resin, melamine resin, phenol-formaldehyde resin, urethane resin and so on.

Of these resins, crosslinkable phenoxy ether resin and acrylic resin, for instance, are hereinafter described in detail.

A particularly preferred example of said crosslinking resin is a phenoxy ether polymer of the following general formula.

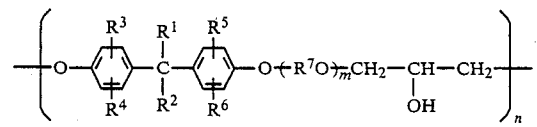

wherein $R^1$ to $R^6$ each is a hydrogen atom, a lower alkyl group of 1 to 3 carbon atoms or Br; $R^7$ is a lower alkylene group of 2 to 4 carbon atoms; m is a whole number of 0 to 3; and n is a whole number of 20 to 300. When a polyfunctional compound, i.e. a crosslinking agent, is reacted with the above polymer, a crosslinking reaction takes place at the hydroxy groups of the polymer to give a crosslinked phenoxy ether polymer.

The crosslinking agent (polyfunctional compound) to be reacted with a polymer of the above general formula to give said crosslinked phenoxy ether resin is a compound having two or more groups which are highly reactive to active hydrogen, such as isocyanato, carboxy, reactive derivatives of carboxy (such as halide, active amide, active ester, acid anhydride, etc.), mercapto and so on.

The acrylic resin is a composition based on a polyfunctional unsaturated monomer containing at least 3 acryloyloxy or/and methacryloyloxy groups (hereinafter referred to as a polyfunctional (meth)acryloyloxy group-containing compound) or/and a composition based on said polyfunctional unsaturated monomer and/or a radical-prepolymer thereof. Particularly preferred is a composition of unsaturated monomers which contains at least 50 weight %, preferably 70 weight % and more desirably 90 weight % of a polyfunctional unsaturated monomer containing at least three (meth)a- cryloyloxy groups or a composition of said monomeric composition and a radical-prepolymer thereof.

All resin layers should be formed by casting. Otherwise, the optical isotropicity of the layers is impaired.

In the casting process, a solution or suspension of the resin is casted on a metal surface (for example, the surface of an endless belt or a drum) or the surface of a heat-resistant synthetic resin film, followed by drying. The heat-resistant synthetic resin film mentioned just above is a resin film which will not undergo deformation, softening, or melting under the temperature conditions prevailing in the casting and subsequent drying processes. Another quality required is that the film will not dissolve or swell in the solvent used. Taking heat resistance, solvent resistance, surface flatness, accuracy of thickness and cost into consideration, the practically most useful heat-resistant film is a biaxially oriented polyester film.

The optically isotropic laminate according to the invention is fabricated by bonding the thus-produced resin layers together by means of an adhesive.

The laminate may also be prepared by casting a resin solution or suspension on a cast resin layer previously formed and, then, drying the resin. In this operation, an anchor coat or adhesive layer may be formed before casting of the second resin solution or suspension.

It should be understood that said anchor or adhesive layer must also be formed by casting.

The thickness of layer (1) is 1 to 50 μm and preferably 2 to 20 μm, while the thickness of layer (2) is generally 1 to 1000 μm and preferably 2 to 500 μm.

Where the gas-impermeable synthetic resin layer (1) is a layer formed from an active hydrogen-containing resin and the cured crosslinking resin layer (2) is a layer of a cured resin composition formed using a crosslinking agent reactive to active hydrogen, direct casting of the crosslinking resin composition on the gas-impermeable synthetic resin layer (1) and subsequent curing by heat or actinic radiation results in the simultaneous formation of the cured crosslinking resin layer (2) and intimate adhesion between said layer (2) and gas-impermeable synthetic resin layer (1).

As examples of the laminate formed by direct superimposition of cured crosslinking resin layer (2) on gas-impermeable synthetic resin layer (1), there may be mentioned the binary laminate of (1)/(2), the ternary laminate of (2)/(1)/(2) or a multiple-layer laminate of (2)/(1)/adhesive layer/(1)/(2).

The binary laminate is fabricated by forming the layer (1) on a metal surface or the surface of a heat-resistant synthetic resin film and, then, forming the layer (2) thereon.

The (2)/(1)/(2) laminate can be prepared by forming a layer (1) on a metal surface or the surface of a heat-resistant synthetic resin film, then forming a layer (2) on top of layer (1) and, after the (1)/(2) laminate is peeled off, forming another layer (2) on the layer (1) of the assembly.

The (2)/(1)/adhesive layer/(1)/(2) laminate can be prepared by bonding a couple of (1)/(2) laminates together using an adhesive in such a manner that the two layers (1) will be disposed adjacently.

Since the optically isotropic laminate (A) thus obtained is used to support the recording layer (B), it should have an overall retardation value not exceeding 80 nm and preferably not more than 30 nm.

The retardation value R is the product of the thickness d of the film multiplied by the absolute value of the difference between the refractive indexes of said film in two mutually perpendicular directions, as expressed by the following equation.

$$R = d \cdot |n^1 - n^2|$$

where $n^1$ is the refractive index in an optional direction and $n^2$ is the refractive index in the direction perpendicular to $n^1$.

Recording layer (B)

On at least one side of the optically isotropic laminate (A) prepared as above, there is formed the recording layer (B).

Examples of the recording layer (B) include such inorganic systems as Te, Te-C (Te-alkyl), $Cs_2$-Te, Te-Se, Pb-Te-Se, TeOx, TeOx-Pd, Bi-Te, Te-Ti-Ag-Se, $Bi_2Te_3$-$Sb_2Se_3$, Sn, In, In-$In_2O_3$, In-$CH_4$-$O_2$, Se, Sb-Se, Ge, $SiO_2$, Tb-Gd, Gd-Co, Gd-Tb-Fe, Gd-Tb-Fe-Ge, Gd-Tb-Co, Tb-Fe, Tb-Fe-Co, Ag-Zn-Al, Cu-Al-In-Sn, Au-Al, Mn-Cu-Bi, Mn-Pt-Sb, etc, such organic dye systems as cyanine dye, leuko dye, etc., organic photochromic systems such as spiropyran, fulgide, tetrabenzopentacene and other materials, and organic metal complexes. A multiplelayer laminate including a reflective layer, a dielectric layer, etc. in addition to the recording layer (B) may also be employed.

If necessary, a protective layer may be disposed on top of the recording layer (B).

In the optical isotropic laminate (A), the cured crosslinking resin layer (2) which is high in hardness contributes to strength, hardness and moisture impermeability, while its brittleness is compensated for by the gas permeable synthetic resin layer (1) which, in addition, imparts a gas barrier property to prevent oxidative degradation of the recording layer. Conversely, the moisture permeability of the latter layer (1) is compensated for by the cured crosslinking resin layer (2).

Thanks to such a laminate structure, the optically isotropic laminate (A) satisfies all the requirements of a flexible base for the optical tape or floppy disk, namely transparency, optical isotropy, heat resistance, moisture-impermeability, mechanical strength, low thermal conductivity, flexibility and gas impermeability.

By selecting an appropriate recording layer (B), the flexible optical material according to the invention can be provided as an erasable, write/playback type, or rewrite (write, playback, erase) type tape or floppy disk. For recording, playback and erasure, a laser beam is generally used.

EXAMPLES

The following examples are further illustrative of the invention. In these examples, all parts are by weight.

Figure 2:
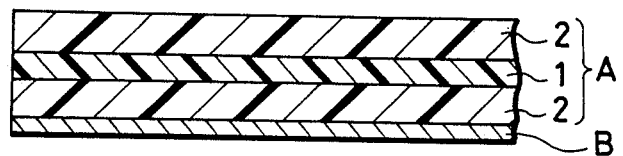
Figure 3:
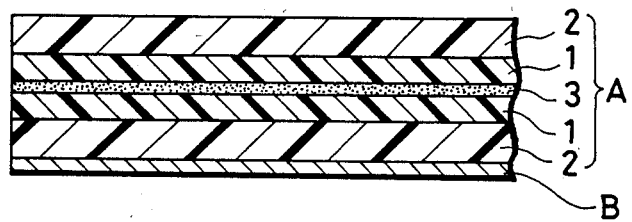

FIGS. 1 to 3 each is a sectional view showing an embodiment of the flexible optical material according to the invention.

A gas-impermeable synthetic resin dope of the undermentioned formula was cast on one side of a 100 μm-thick biaxially oriented polyester film, which is an example of the heat-resistant synthetic resin film, and dried in a dryer at 110° C. to provide a 7 μm-thick gas-impermeable synthetic resin layer (1).

| | |
|---|---|
| Ethylene-vinyl acetate copolymer hydrolysate (ethylene content 32 mole %) | 20 Parts |
| Water | 45 Parts |

| | |
|---|---|
| n-Propanol | 50 Parts |
| Methylolated melamine (Sumitex M-3, Sumitomo Chemical Co., Ltd.) | 4 Parts |

Then, using an applicator, a curable resin solution of the under-mentioned formula was coated on the above gas-impermeable synthetic resin layer (1) and dried at 80° C. for 4 minutes. Thereafter, the assembly was heated at 135° C. for 30 minutes to provide a 14 μm-thick crosslinked phenoxy ether resin layer (2).

| | |
|---|---|
| Phenoxy ether resin (Union Carbide Co., Ltd.) | 40 Parts |
| Methyl ethyl ketone | 40 Parts |
| Cellosolve acetate | 20 Parts |
| Tolylene diisocyanate-trimethylol-propane adduct (75% solution) (Coronate L, Japan Polyurethane Co., Ltd.) | 40 Parts |

Then, the above laminate (A) consisting of gas-impermeable synthetic resin layer (1) and cured crosslinking resin layer (2) was peeled off from the heat-resistant synthetic resin film.

In this manner, there was obtained an optically isotropic binary laminate (A-1) consisting of gas-impermeable synthetic resin layer (1) and cured crosslinking resin layer (2) as shown in FIG. 1. This laminate had an overall thickness of 21 μm and a retardation value of 4 nm.

This laminate (A-1) was optically isotropic and colorless, and had an oxygen permeability (ASTM D-1434-75) of 2 cc/24 hr.m².atm and an average visible light transmittance of 95%. The cured crosslinking resin surface of the laminate had a pencil hardness of about H.

Then, using an applicator, a curable resin dope of the same composition as above was coated on top of the gas-impermeable synthetic resin layer (1) of the laminate and dried at 80° C. for 4 minutes, followed by curing at 135° C. for 30 minutes to provide a crosslinked phenoxy ether resin layer (2) having a cured thickness of 13 μm.

By the above procedure, there was obtained an optically isotropic ternary laminate (A-2) consisting of cured crosslinking resin layer (2) - gas-impermeable synthetic resin layer (1) - cured crosslinking resin layer (2) as shown in FIG. 2. This laminate (A-2) had an overall thickness of 34 μm and a retardation value of 6 nm.

The above laminate (A-2) was optically isotropic, colorless and symmetric and had an oxygen permeability (ASTM D-1434-75) of 1.8 cc/24 hr.m².atm and an average visible light transmittance of 93%. Its surface showed a pencil hardness of about 2H and was moisture-impermeable.

The optically isotropic laminate (A-1) was prepared in a set of 2 and an isocyanate adhesive solution was cast on the gas-impermeable synthetic resin surface of one laminate (A-1). The other laminate (A-1) was then superimposed on the adhesive layer in such a manner that the gas-impermeable resin (1) side faces the adhesive layer and the whole assembly was passed over a heater roll set for adhesion.

By the above procedure, there was obtained an optically isotropic laminate (A-3) consisting of cured crosslinking resin layer (2) - gas-impermeable synthetic resin layer (1) - adhesive layer (3) - gas-impermeable synthetic resin layer (1) - cured crosslinking resin layer (2) as shown in FIG. 3. The thickness of the adhesive layer was 8 μm. This laminate (A-3) had an overall thickness of 50 μm and a retardation value of 7 nm.

This laminate (A-3) was optically isotropic, colorless and symmetric and had an oxygen permeability (ASTM D-1434-75) of 1.6 cc/24 hr.m².atm and an average visible light transmittance of 91%. Its surface had a pencil hardness of about H and was impervious to moisture.

Then, on top of the gas-impermeable synthetic resin layer (1) of the laminate (A-1), a 90 μm-thick Te recording layer (B) was superimposed by vacuum vapor deposition.

Similarly, on one of the cured crosslinking resin layers (2) of the optically isotropic laminate (A-2) and of laminate (A-3), a 70 μm-thick Te recording layer (B) was formed by vacuum vapor deposition. Then, on top of this recording layer, a 90 μm-thick aluminum reflective layer was further provided.

The three types of optical tapes thus obtained were invariably quite satisfactory in performance.

By the same procedure as (A-3) above except that the thicknesses of layers were altered, there was obtained an optically isotropic laminate (A-4) consisting of cured crosslinking resin layer (2) -gas-impermeable synthetic resin layer (1) - adhesive layer (3) - gas-impermeable synthetic resin layer (1) -cured crosslinking resin layer (2). The thicknesses of layers were 250 μm/25 μm/20 μm/25 μm/250 μm in that order and this laminate (A-4) had an overall thickness of 570 μm and a retardation value of 17 nm.

This laminate (A-4) was optically isotropic, colorless and symmetric and had an oxygen permeability (ASTM D-1434-75) of 0.9 cc/24 hr.m².atm and an average visible light transmittance of 90%. Its surface had a pencil hardness of about H and was impervious to moisture.

On both sides of the cured crosslinking resin layers (2) of the optically isotropic laminate (A-4), a 70 μm-thick Te recording layers (B) were formed by vacuum vapor deposition.

Then, this laminate (A-4) was punched into a disk. The optical disk thus obtained was invariably quite satisfactory in performance.

What is claimed is:

1. A flexible optical recording material in the shape of tape or floppy disk comprising an optically isotropic laminate (A) comprising at least one thermoplastic gas-impermeable synthetic resin film layer (1) formed from a polymer containing at least 50 mole percent or acrylonitrile, vinyl alcohol or halogenated vinylidene and at least one cured crosslinked resin layer (2), said layers having been formed by casting and having a retardation value of not less than 80 nm as a whole, and a recording layer (B) disposed on at least one side of said optically isotropic laminate (A).

2. The flexible optical recording material according to claim 1 wherein said gas-impermeable synthetic resin layer (1) is a layer made of an active hydrogen-containing resin, said cured crosslinking r(R)sin layer (2) is a layer formed using a crosslinking agent reactive to active hydrogen, and said cured crosslinking resin layer is directly disposed on said gas-impermeable synthetic resin layer (1).

* * * * *